United States Patent [19]
Sugimoto

[11] Patent Number: 6,039,153
[45] Date of Patent: Mar. 21, 2000

[54] BICYCLE BRAKE WITH LINK-ADJUSTED BRAKE SHOES

[75] Inventor: Masanori Sugimoto, Osakasayama, Japan

[73] Assignee: Shimano, In., Osaka, Japan

[21] Appl. No.: 09/103,980

[22] Filed: Jun. 22, 1998

[51] Int. Cl.[7] .................................. B62L 3/00; B62L 1/06
[52] U.S. Cl. .................................... 188/24.22; 188/24.19; 74/522
[58] Field of Search .............................. 188/24.11, 24.12, 188/24.19, 24.21, 24.22; 74/522

[56] References Cited

U.S. PATENT DOCUMENTS

| | | | |
|---|---|---|---|
| 5,103,938 | 4/1992 | Yoshigai | 188/24.19 |
| 5,152,377 | 10/1992 | Yoshigai | 188/24.12 |
| 5,501,301 | 3/1996 | Nishimura | 188/24.19 |
| 5,636,716 | 6/1997 | Sugimoto et al. | 188/24.19 |

FOREIGN PATENT DOCUMENTS

| | | | |
|---|---|---|---|
| 2254864Y | 5/1997 | China | B62L 1/14 |
| 209472 | 3/1993 | Taiwan | B62L 1/02 |
| 0571477 | 8/1945 | United Kingdom | 188/24.12 |

Primary Examiner—Christopher P. Schwartz
Assistant Examiner—Lan Nguyen
Attorney, Agent, or Firm—James A. Deland

[57] ABSTRACT

A bicycle brake apparatus includes a brake arm having an upper portion and a lower portion and a link member having an upper portion and a lower portion. The lower portion of the brake arm and the lower portion of the link member pivot relative to each other around a common pivot axis. A shoe attachment member is disposed on the upper portion of the link member, and a link fixing mechanism is provided for fixing the link member relative to the brake arm. The link fixing mechanism includes a fixing shaft extending from one of the brake arm and the link member and a shaft opening defined by the other one of the brake arm and the link member so that the fixing shaft extends through the shaft opening. A diameter of the shaft opening is greater than a diameter of the fixing shaft, and an adjusting member is disposed in the shaft opening. The adjusting member defines an adjusting opening for receiving the fixing shaft therethrough at a position offset from a center of the shaft opening. Rotation of the adjusting member therefore adjusts the angle and position of the brake shoe relative to the brake arm.

13 Claims, 3 Drawing Sheets

BICYCLE BRAKE WITH LINK-ADJUSTED BRAKE SHOES

BACKGROUND OF THE INVENTION

The present invention is directed to bicycle braking devices and, more particularly, to a cantilever brake having brake shoes attached to adjustable links so that the lateral position of the brake shoes may be adjusted.

Cantilever style brakes are often used on mountain bikes and occasionally on road bikes to provide stronger braking force per unit of force applied to the brake lever than that provided by conventional caliper style brakes. A cantilever brake ordinarily comprises a pair of opposed brake arm assemblies, wherein each brake arm assembly includes a brake arm having an upper portion and a lower portion. A brake shoe is disposed on an intermediate portion of each brake arm such that the brake shoes face each other. The lower portion of each brake arm is pivotally attached to the bicycle frame, and a brake control cable coupling assembly is disposed on the upper portion of each brake arm. In one type of cantilever brake the upper portion of each brake arm is angled outwardly from the wheel rim and the brake is operated by pulling generally upwardly on a brake control cable wire attached to the cable coupling assembly of each brake arm. In another type of cantilever brake the brake arms are essentially straight. In this case an outer casing of the brake control cable is attached to the brake control cable coupling assembly of one brake arm and an inner wire of the brake control cable is attached to the brake control cable coupling assembly of the other brake arm. This type of brake is very efficient because the force of the brake control cable is applied substantially perpendicular to each brake arm.

With either type of cantilever brake, it is desirable to apply the force of the brake control cable as perpendicular to the brake arms as possible when the brake shoes are in the vicinity of the wheel rim to maximize the braking force per unit of force applied to the brake lever. Also, it is desirable to have the brake shoe oriented perpendicular to the rim sidewall when the brake shoe contacts the rim. Brake arm assemblies are designed with those goals in mind. However, brake arm assemblies designed for mountain bikes, for example, often are not optimized for use on road bikes because mountain bikes have relatively wide wheel rims, whereas road bikes have relatively narrow wheel rims. As a result, brake arm assemblies designed for mountain bikes will angle too far inwardly before the brake shoe contacts the rim of a road bike. Conversely, a brake arm assembly designed for road bikes will be angled too far outwardly when the brake shoe contacts the rim of a mountain bike. As a result, different brake shoe assemblies must be designed for different bicycles if optimum performance is desired. This increases design, tooling and manufacturing costs for the manufacturer and inventory costs for the dealer, and it prevents the bicyclist from using one type of brake arm assembly with different style bicycles.

SUMMARY OF THE INVENTION

The present invention is directed to a bicycle brake arm assembly which can be optimally used with bicycles having different configurations, especially those with varying rim widths. In one embodiment of the invention, a bicycle brake apparatus includes a brake arm having an upper portion and a lower portion and a link member having an upper portion and a lower portion. The lower portion of the brake arm and the lower portion of the link member pivot relative to each other around a common pivot axis. A shoe attachment member is disposed on the upper portion of the link member, and a link fixing mechanism is provided for fixing the link member relative to the brake arm. The link fixing mechanism includes a fixing shaft extending from one of the brake arm and the link member and a shaft opening defined by the other one of the brake arm and the link member so that the fixing shaft extends through the shaft opening. A diameter of the shaft opening is greater than a diameter of the fixing shaft, and an adjusting member is disposed in the shaft opening. The adjusting member defines an adjusting opening for receiving the fixing shaft therethrough at a position offset from a center of the shaft opening. Rotation of the adjusting member therefore adjusts the angle and position of the brake shoe relative to the brake arm.

DETAILED DESCRIPTION OF THE EMBODIMENTS

Figure 1A:
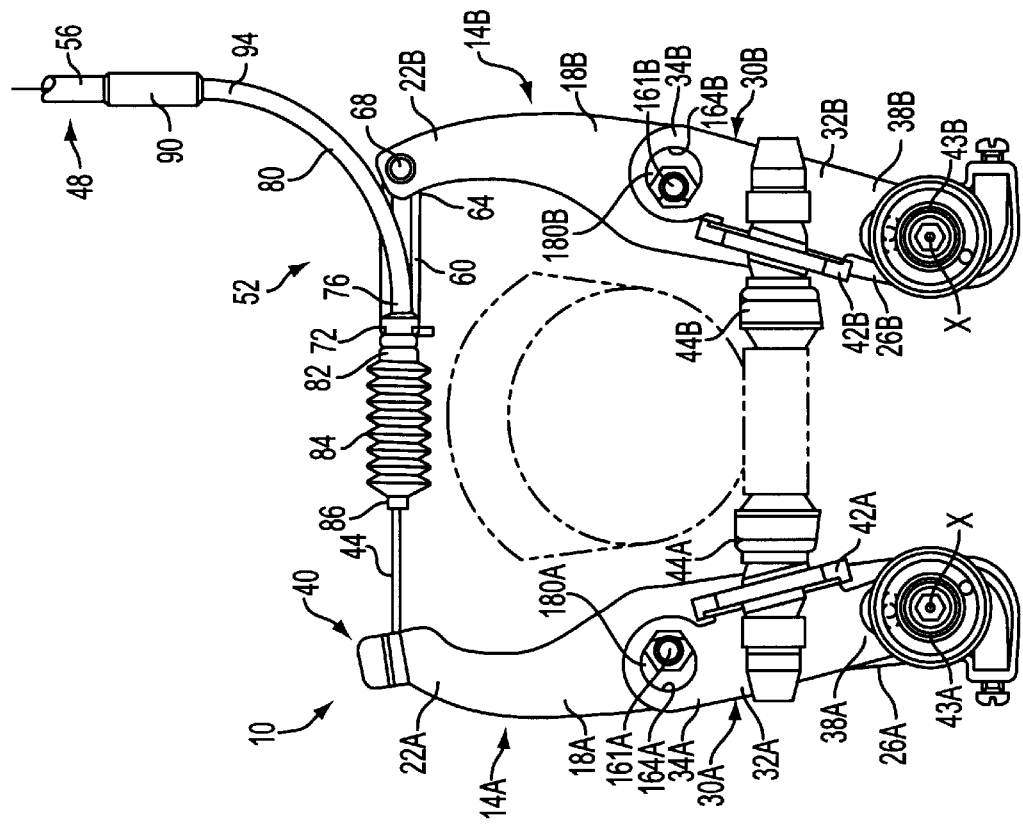
FIGS. 1A and 1B are rear views of a particular embodiment of a brake device according to the present invention.
Figure 1B:
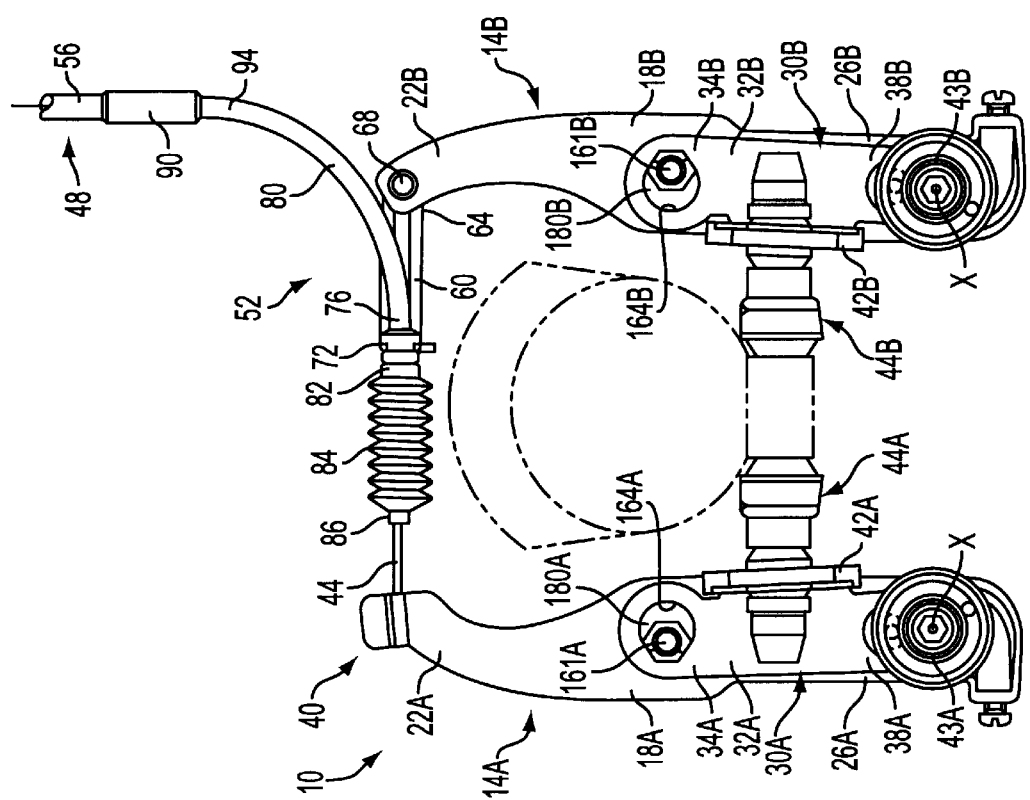
Figure 2:
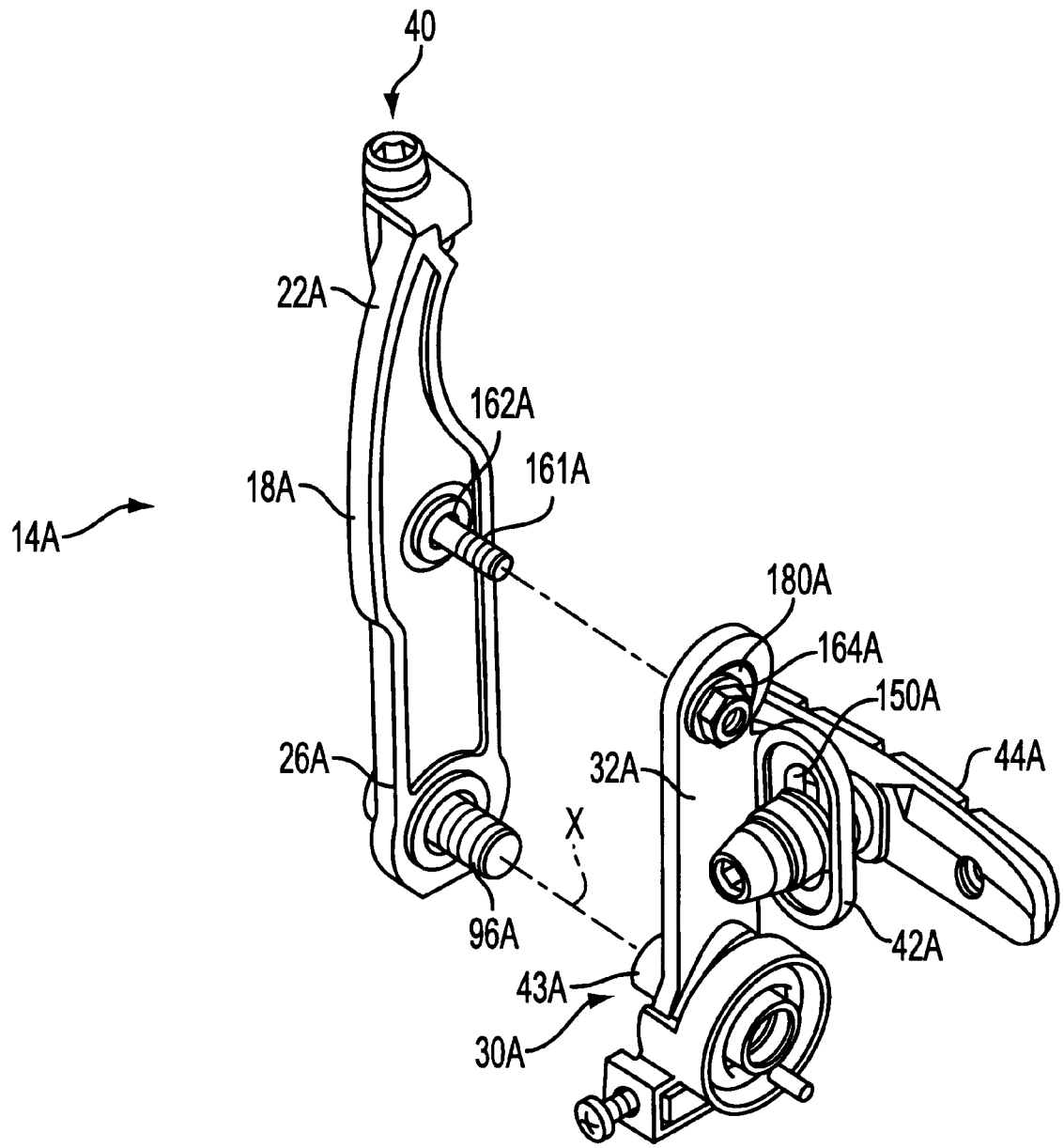
FIG. 2 is a partially exploded view of the brake device shown in FIGS. 1A and 1B.
Figure 3:
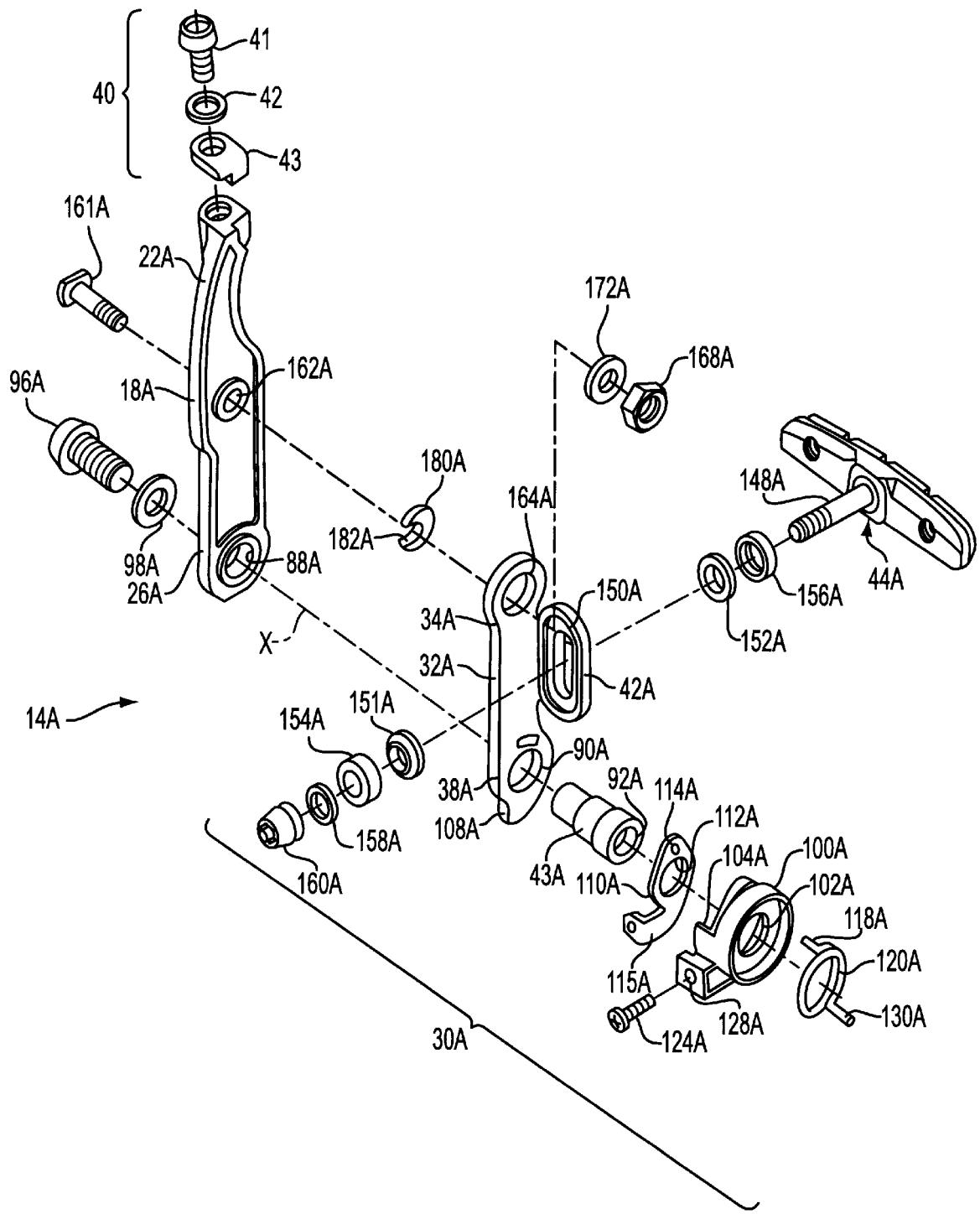
FIG. 3 is a completely exploded view of the brake device shown in FIGS. 1A and 1B.

FIGS. 1A and 1B are rear views of a particular embodiment of a brake apparatus 10 according to the present invention, and FIGS. 2 and 3 are partially and completely exploded views, respectively, of brake apparatus 10. Brake apparatus 10 has a pair of brake arm assemblies 14A, 14B, wherein each brake arm assembly 14A,14B includes a brake arm 18A,18B having an upper portion 22A,22B and a lower portion 26A,26B and a link member assembly 30A,30B. Each link member assembly 30A,30B comprises a link member 32A, 32B, each having an upper portion 34A,34B and a lower portion 38A,38B. A shoe attachment member in the form of a flange 42A,42B is disposed on the upper portion 34A,34B of each link member 30A,30B for supporting a corresponding brake shoe 44A,44B. The lower portion 26A,26B of each brake arm 18A,18B and the lower portion 38A,38B of each link member assembly 30A,30B are pivotably supported on a pivot shaft 43A,43B so that each link member assembly 30A,30B can pivot relative to its corresponding brake arm 18A,18B around a common pivot axis X. More specifically, the lower portion 26A of brake arm 18A has an opening 88A that pivotably fits around pivot shaft 43A, and the lower portion 38A of link member 32A has an opening 90A that pivotably fits around pivot shaft 43A. The entire assembly is held in place by a bolt 96A and washer 98A, wherein bolt 96A extends through an opening 88A in the lower portion 26A of brake arm 18A, through an opening 90A in the lower portion 38A of link member 32A, and into a threaded opening 92A in pivot shaft 43A.

A brake control cable coupling assembly 40 comprising a screw 41 (FIG. 3), a washer 42 and a fixing plate 43 is disposed on the upper portion 22A of brake arm 18A for coupling brake arm assembly 14A to an inner wire 44 of a brake control cable 48, and a brake control cable coupling assembly 52 is disposed on the upper portion 22B of brake arm 18B for coupling brake arm assembly 14B to an outer casing 56 of control cable 48. More specifically, brake control cable coupling assembly 52 comprises a connecting arm 60 having a first end 64 pivotably coupled to upper portion 22B of brake arm 18B through a pivot coupling 68 and a second end 72 attached to one end 76 of a guide tube 80. One end 82 of a bellows seal 84 is attached to end 76 of guide tube 80, and the other end 86 of bellows seal 84 sealingly engages inner wire 44 of brake control cable 48. A casing receptacle 90 is disposed on the other end 94 of guide tube 80 for receiving outer casing 56 therein. As a result of this structure, braking force applied to control cable 48 is applied to brake apparatus 10 substantially perpendicular to brake arms 18A and 18B, thus generating a strong braking force.

Because of the otherwise symmetrical nature of brake arm assemblies 14A and 14B, only the details of brake arm assembly 14A will now be described in detail.

As shown more specifically in FIG. 3, a spring cover 100A having an opening 102A that fits around pivot shaft 43A has an abutment 104A that abuts against an abutment 108A on link member 32A. A spring retainer 110A has an opening 112A that fits around pivot shaft 43A so that spring retainer 110A is disposed between link member 32A and spring cover 100A. Spring retainer 110A has a spring retaining opening 114A and an adjustment abutment 115A. Spring retaining opening 114A retains an end 118A of a spring 120A, and adjustment abutment 115A abuts against an end of an adjusting screw 124A that screws into a threaded opening 128A in spring cover 100A. The other end 130A of spring 120A is fixed to the bicycle frame (not shown). Thus, the biasing force of spring 120A may be adjusted by turning adjusting screw 124A which, in turn, rotates spring retainer 110A around pivot shaft 43A to move spring end 118A.

As noted above, a shoe attachment member in the form of a flange 42A,42B is disposed on the upper portion 34A,34B of each link member 30A,30B for supporting a corresponding brake shoe 44A,44B. As shown in FIG. 3, brake shoe 44A has a threaded shaft 148A that extends through a vertically elongated slot 150A in flange 42A and is fixed to flange 42A through convex washers 152B,152A, concave washers 154A,156A, fastening washer 158A and fastening nut 160A in a known manner that allows the vertical position and mounting angle of brake shoe 44A to be varied.

A fixing shaft in the form of a screw 160A extends snugly through a shaft opening 162A in the upper portion 22A of brake arm 18A and through a shaft opening 164A in the upper portion 34A of link member 32A. A fixing nut 168A and a fixing washer 172A mates with fixing screw 160A to fix the angle of link member 32A relative to brake arm 18A. In this embodiment, the inner diameter of shaft opening 164A is substantially greater than the outer diameter of screw 160A, and an adjusting member 180A having an adjusting opening or slot 182A is disposed in shaft opening 164A for snugly receiving screw 160A therethrough at a position offset from a center of shaft opening 164A.

To use the brake device 10 according to this embodiment, it is first determined whether brake device 10 will be used with a wide rim or a narrow rim. If a narrow rim is used, then adjusting members 180A,180B are disposed in their respective shaft openings 164A,164B so that adjusting openings 182A, (only adjusting opening 182A is shown) open laterally outwardly to set the angular position of link member 32A relative to brake arm 18A as shown in FIG. 1A. On the other hand, if a wide rim is used, then adjusting members 180A,180B are disposed in their respective shaft openings 164A,164B so that adjusting openings 182A, open laterally inwardly to set the angular position of link members 32A, 32B relative to brake arms 18A,18B as shown in FIG. 1B. Thus, the same brake device 10 may be used with rims having different widths.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Thus, the scope of the invention should not be limited by the specific structures disclosed. Instead, the true scope of the invention should be determined by the following claims.

What is claimed is:

1. A bicycle brake apparatus comprising:
   a brake arm having an upper portion and a lower portion;
   a link member having an upper portion and a lower portion;
   wherein the lower portion of the brake arm and the lower portion of the link member pivot relative to each other around a common pivot axis;
   a shoe attachment member disposed on the link member;
   a link fixing mechanism for fixing the link member relative to the brake arm, wherein the link fixing mechanism comprises:
      a fixing shaft extending from one of the brake arm and the link member;
      a shaft opening defined by the other one of the brake arm and the link member so that the fixing shaft extends through the shaft opening; and
   an adjusting member disposed in the shaft opening, wherein the adjusting member defines an adjusting opening for receiving the fixing shaft therethrough at a position offset from a center of the shaft opening.

2. The apparatus according to claim 1 further comprising a fastener mounted to the fixing shaft for fixing the link member relative to the brake arm.

3. The apparatus according to claim 2 wherein the fixing shaft has a threaded portion, and wherein the fastener comprises a threaded nut that screws onto the threaded portion of the fixing shaft.

4. The apparatus according to claim 1 wherein the link fixing mechanism is disposed above the shoe attachment member.

5. The apparatus according to claim 1 further comprising:
   a spring having a first end and a second end; and
   a spring retainer for retaining the first end of the spring, wherein the spring retainer is mounted in close proximity to the link member and rotates around the pivot axis.

6. The apparatus according to claim 5 further comprising an adjusting screw for rotating the spring retainer around the pivot axis.

7. The apparatus according to claim 6 further comprising a spring cover retained to the link member, wherein the spring is disposed within the spring cover, and wherein the adjusting screw is disposed in the spring cover.

8. The apparatus according to claim 7 wherein the spring retainer is disposed between the spring cover and the link member.

9. The apparatus according to claim 1 wherein the shoe attachment member is disposed on the upper portion of the link member.

10. The apparatus according to claim 1 wherein a diameter of the shaft opening is greater than a diameter of the fixing shaft.

11. A bicycle brake apparatus comprising:
    a brake arm having an upper portion and a lower portion;
    a link member having an upper portion and a lower portion;

wherein the lower portion of the brake arm and the lower portion of the link member pivot relative to each other around a common pivot axis;

a shoe attachment member disposed on the link member;

a link fixing mechanism for fixing the link member relative to the brake arm, wherein the link fixing mechanism comprises:

a fixing shaft extending from one of the brake arm and the link member;

a shaft opening defined by the other one of the brake arm and the link member so that the fixing shaft extends through the shaft opening; and an adjusting member for adjusting a position of the brake shoe relative to the brake arm by rotating the adjusting member.

12. The apparatus according to claim 11 wherein rotation of the adjusting member adjusts an angular position of the link member relative to the brake arm.

13. The apparatus according to claim 11 wherein rotation of the adjusting member adjusts a lateral position of the brake shoe relative to the brake arm.

* * * * *